C. V. JAMESON.
PNEUMATIC DEVICE FOR PLAYER PIANOS.
APPLICATION FILED JAN. 18, 1915.
1,219,104.
Patented Mar. 13, 1917.
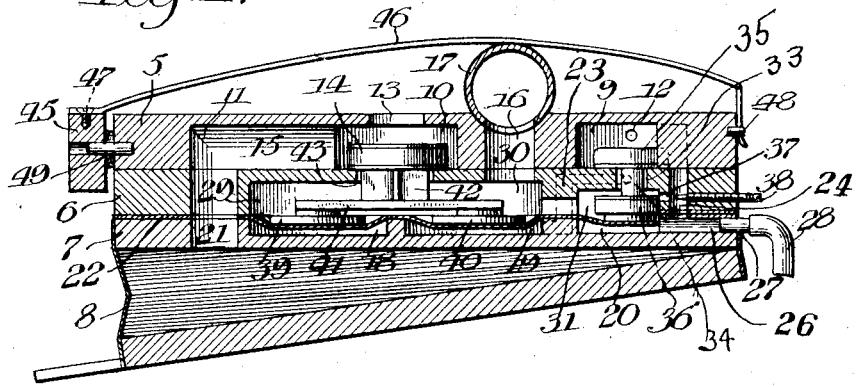
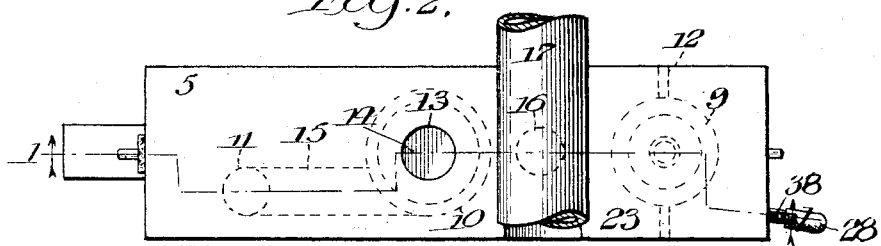
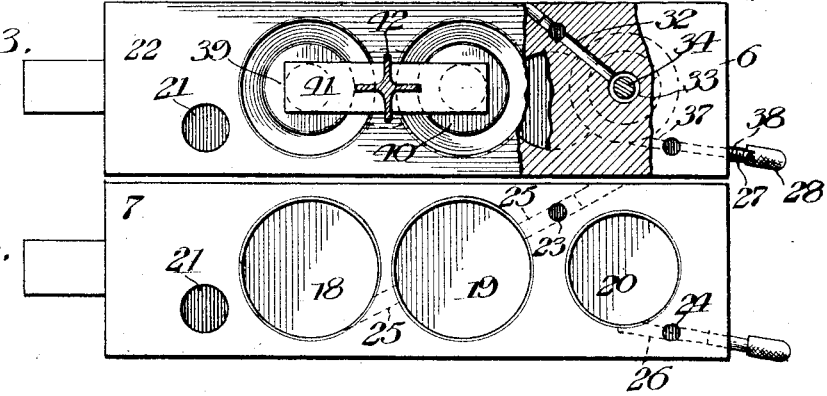
Witnesses
Walter H. Redfield.
James C. Redfield
Inventor
Charles V. Jameson
by Casper L. Redfield
atty.

UNITED STATES PATENT OFFICE.

CHARLES V. JAMESON, OF CHICAGO, ILLINOIS.

PNEUMATIC DEVICE FOR PLAYER-PIANOS.

1,219,104. Specification of Letters Patent. Patented Mar. 13, 1917.

Application filed January 18, 1915. Serial No. 2,835.

*To all whom it may concern:*

Be it known that I, CHARLES V. JAMESON, a citizen of the United States of America, and a resident of Chicago, county of Cook, and State of Illinois, have invented certain new and useful Improvements in Pneumatic Devices for Player-Pianos, of which the following is a specification.

My invention relates to pneumatic devices for player pianos, and has for its object improvements in the construction and operation of such devices.

In the accompanying drawings

Figure 1 is an irregular sectional elevation on the line 1—1 of Fig. 2;

Fig. 2 is a plan of the top of the valve box;

Fig. 3 is a similar plan with the top plate removed, and the central plate broken away to show the parts beneath; and Fig. 4 is a corresponding plan of the bottom plate of the valve box.

The valve box consists of three flat plates of wood, 5, 6 and 7, which are glued or cemented together to form a rectangular body containing the requisite chambers, valves and passageways for controlling an action pneumatic. The lower plate 7 of the box forms the upper plate of the pneumatic 8, so that the pneumatic and valve containing box form a complete and self-contained unit which may be inserted in or removed from the piano without disconnecting or disturbing any other part.

The plates 5, 6 and 7 are so related to each other in their thickness that all chambers, ports and passageways desired in the completed box may be formed by plain drilling or boring in the separate plates and then securing the plates together, one on top of the other.

The top plate 5 has bored into its lower face the recesses 9, 10 and 11. A small hole 12 is drilled anywhere through the plate, as at the side, to connect the recess 9 with the outside air. The recess 10 has an axial opening 13 through the top of the plate 5, which opening serves as a port connecting the recess 10 with the outside air, and which port is adapted to be closed by a valve 14 located in the recess 10. The recess 11 is connected to the recess 10 by a channel 15, which channel is conveniently formed by using the same tool to cut away the wood as that which was used to bore the recess 11. The removal of the wood to form the channel 15 may be performed in any way, the point here being simply that by making the box of plates separated by certain dividing lines I have simplified the process of forming the channel.

Drilled straight through the plates 5 between the recesses 9 and 10, is a hole 16 which matches a corresponding hole in the side of the vacuum tube 17. The tube 17 rests in a slight recess in the upper face of the plate 5 so that there will be no tendency for the tube and box to become displaced with respect to each other.

The lower plate 7 has recesses 18, 19 and 20 in its upper face and a through hole 21 which matches a similarly placed hole through the central plate 6 and serves to connect the recess 11 with the interior of the pneumatic 8. The upper face of the plate 7 is covered with sheep skin 22 which forms pouches over the recesses 18, 19 and 20. Also in the upper face of the plate 7 are small recesses or holes 23 and 24. A diagonal hole 25, drilled from the edge of the plate 7, serves to connect the lower end of the hole 23 with the lower portions of the recesses 18 and 19 under the pouches which cover them. The outer end of the hole 25 is then plugged. A hole 26 in the end of the plate 7 connects the lower end of the hole 24 to the space covered by the pouch over recess 20. A nipple 27 and tube 28 serve to connect the recess 20 and hole 24 with one of the holes in the tracker bar used in the player.

In the lower face of the central plate 6 are recesses 29, 30 and 31 which match recesses 18, 19 and 20 when the plates 6 and 7 are connected together by glue or cement. The recesses 29 and 30 are connected together by a hole through the plate 6, which hole is in line with port 13 in plate 5 and forms the port 43 under valve 14. The recess 30 is connected to recess 31 by removing the intervening bridge, most conveniently by using the same boring tool used to form recess 31. As thus formed, the recesses 29, 30 and 31 constitute one continuous recess located in the under face of the plate 6, and the hole 16 is extended through the top of the plate 6 into this recess.

The holes 23 and 24, which have their lower ends terminating inside of the lower plate 7, extend upward through the central plate 6, and have their upper ends closed by the top plate 5 when the three plates are secured together. A diagonal hole 32 connects that part of hole 23 which is in plate 6 with a hole 33 extending through plates 6 at the axis of recess 31. Extending through the hole 33 is a stem 34 which has on its opposite ends the valve heads 35 and 36. The stem 34 is smaller than the diameter of the hole 33 so that said stem will not interfere with the flow of air through the hole 32. The hole 33 is in fact a port having upper and lower ends alternately closed and opened according to the position of the valve 35—36.

The head 36 rests on the pouch over recess 20 and when said pouch is slack the head 35 closes the upper end of port 33. In this condition the recess 31 is connected through ports 33, holes 32, 23 and 25 with the recesses 19 and 18. When air is admitted to recess 20 through tube 28, nipple 27, and hole 26, the pouch over the recess 20 rises to shift the valve 35—36 so as to close the lower and open the upper end of port 33. In this condition the recesses 18 and 19 are connected through the before mentioned passageways with the recess 9 and consequently with the outside air through the holes 12.

In the end of the plate 6 is a small hole 37 which connects hole 24 with recess 31, and in this hole is a bleed-controlling screw 38 designed to regulate the size of this connection so as to reduce the amount of air-flow through hole 37 to any desired extent.

The leather which covers plate 7 and forms pouches for recesses 18, 19 and 20, is cut through at holes 21, 23 and 24 so as not to interfere with the flow of air through these passageways.

Resting on the pouches over recesses 18 and 19 are disks 39 and 40 connected together by a bridge 41 which carries the stem 42 of valve 14. When these pouches are slack the valve 14 closes port 43, but when air is admitted to recesses 18 and 19 through hole 25, the valve 14 is shifted to open port 43 and close port 13.

The tube 17 connects to a bellows or to a vacuum chest, and is in fact the vacuum chest of the player piano as far as the present devices are concerned. The vacuum existing in tube 17 is communicated through hole 16 to the interior of the valve box and retains the devices normally in the position shown in Fig. 1.

When the perforated music sheet opens the port in the tracker bar connected to the tube 28 shown in the drawings, air flows through the passageway 27—24—26 to the recess 20. As there is a vacuum in the continuous recess 29—30—31 over the pouch which covers recess 20, this admitted air will raise the pouch and shift the valve 35—36 to close the lower end and open the upper end of port 33. As the upper end of port 33 communicates with the outside air, this air will flow inward through passageway 32—23—25 to the recesses 19 and 18 and raise the pouches which cover them. This in turn raises valve 14 to open port 43 and close port 13. The vacuum space 29—30—31 is then in communication with the air in the pneumatic 8 by way of the passage 21—11—15, with the result that the pneumatic collapses to operate the player action.

When the inward flow of air through the tube 28 is cut off by reason of the music sheet covering the port in the tracker bar leading to it, the air in recess 20 is drawn out through passageway 26—24—37 into the vacuum space in plate 6, and the valve 35—36 shifts to its lower position. This connects the port 33 with the vacuum space instead of with the outside air with the result that the air in recesses 18 and 19 is drawn out and the valve shifted to its lower position. The fall of the valve 14 connects port 13 to the passageway 15—11—21 and permits outside air to flow to the pneumatic 8.

The valve 14 is of comparatively large size and requires power enough to move it quickly. I furnish this power by two pouches which lie side by side and operate simultaneously to move the valve. To make one pouch with equal power would require a recess of larger diameter than 18 and 19, and this would make the valve box wider than is necessary when two pouches are used as shown. But the width of the valve boxes is necessarily limited to avoid complications in connections to the piano action. The necessary or desired power is secured in narrow boxes by the use of two pouches operating simultaneously upon one valve.

The use of two pouches as described to obtain ample power should not be confused with attempts to obtain the same result by one oval pouch of an area equal to the two round ones. It has been determined by experience that the only reliable pouch is a circular one secured to the edges of a round recess, and that an oval one will operate irregularly and unevenly.

On a rail 45 located in the case of the piano is secured a flat spring 46 held in place by a screw 47. The spring extends over and in contact with the vacuum tube 17, and its front end extends downward to engage a pin 48 in the front end of the valve box. Also in the rail 45 is a pin 49 adapted to engage a hole in the rear end of the valve box and support said end in a fixed position in the piano case. The tube 17 is also fixed in the case, and as the spring 46 engages the upper face of this tube and the pin 48 in front, it will be evident that the spring acts to support the front end of the box in a fixed position. The spring is given tension to clamp the valve box against the tube with sufficient force to make a tight joint where the hole 16 communicates with the interior of the tube. By manually releasing the front end of the spring from the pin 48, the front end of the box will drop down enough to clear the tube, whereupon the box may be drawn away from the pin 49 to remove the valve box and pneumatic from the piano without removing the vacuum chest, releasing screws or disturbing any of the fixed parts in the piano case.

It is to be observed that the vacuum chest is a round tube and not a rectangular body as ordinarily used. Also, that it has a bearing in the body of the box at the junction of the hole 16, and, rotatively considered with respect to the axis of the tube, the box does not need to be accurately located to make a tight joint between the tube and the box. All that is necessary is that the hole in the tube is in fair registry with the hole in the box.

Because the rotative position of the box with respect to the tube is not a matter requiring accuracy of adjustment it is not necessary that special pains be taken in locating the pin 49 or the hole in the box which fits it.

It will be observed that the pneumatic, the valve box and valves, the bleed control, and nipple for connection to tracker are all permanently connected together to form a unit which may be placed in the piano or removed therefrom without affecting the connection of the parts of the unit to each other or their adjustment. The manner of connecting this unit to the vacuum chest and supporting it in the piano is, however, not claimed in this application, but form the subject matter of another application filed on even date herewith and given Serial Number 2,836.

What I claim is:

1. In a valve box for player pianos, a valve controlling the flow of air to and from a pneumatic, two pouches, a bridge connected to the valve and resting upon said pouches, a primary valve for controlling the flow of air to operate said pouches, a pouch for said primary valve, and connections extending to a tracker for admitting air under the pouch for the primary valve.

2. In a valve box for player pianos, a valve controlling the flow of air through the box, two pouches, a bridge connected to the valve and resting upon said pouches, and means for admitting air to and exhausting it from the spaces under said pouches.

3. In a valve box for player pianos, a valve controlling the flow of air through the box, two circular pouches, a bridge having its ends mounted upon the centers of said pouches, a stem connecting the center of the bridge to the valve, and means for admitting air to and exhausting it from the spaces under said pouches so as to cause said pouches to act together to move said valve.

4. The combination with a pneumatic having recesses formed in the outer face of its stationary member, and pouches mounted over said recesses, of a plate mounted upon said stationary member and having recesses in its lower face to correspond with the pouch covered recesses, an upper plate mounted upon the previously mentioned plate and having a recess in its under face, and a valve located in the recess in the upper plate and operated by the pouches covering the recesses in the stationary member of the pneumatic.

Signed at Chicago, Ill. this 15th day of January, 1915.

CHARLES V. JAMESON.

Witnesses:
WALTER H. REDFIELD,
JAMES C. REDFIELD.

Copies of this patent may be obtained for five cents each, by addressing the "Commissioner of Patents, Washington, D. C."